April 22, 1941.  H. C. HILL  2,239,039
CONNECTING ROD
Filed April 9, 1938  2 Sheets-Sheet 1
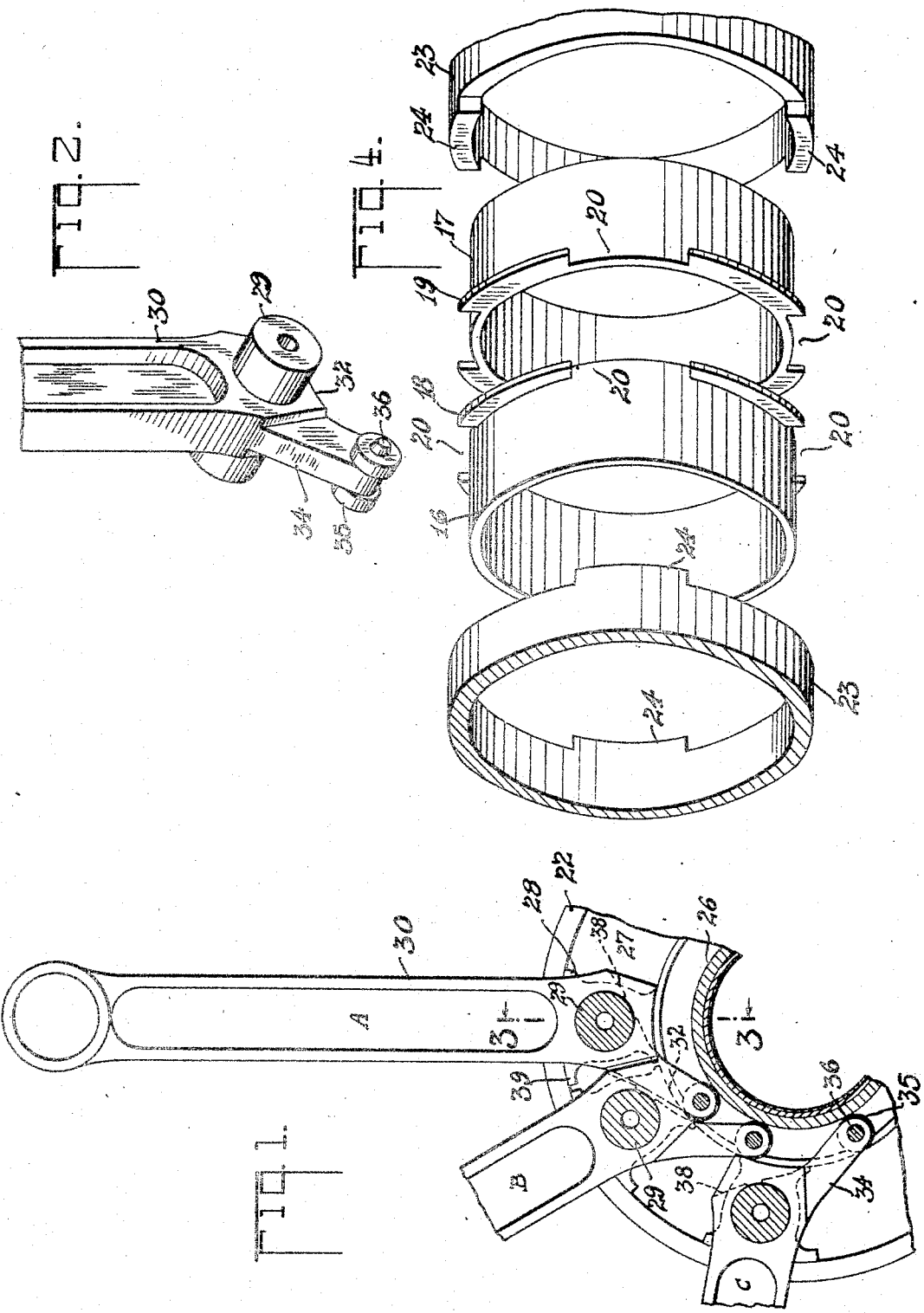
INVENTOR
*HENRY C. HILL*
BY
ATTORNEY April 22, 1941.    H. C. HILL    2,239,039
CONNECTING ROD
Filed April 9, 1938    2 Sheets-Sheet 2
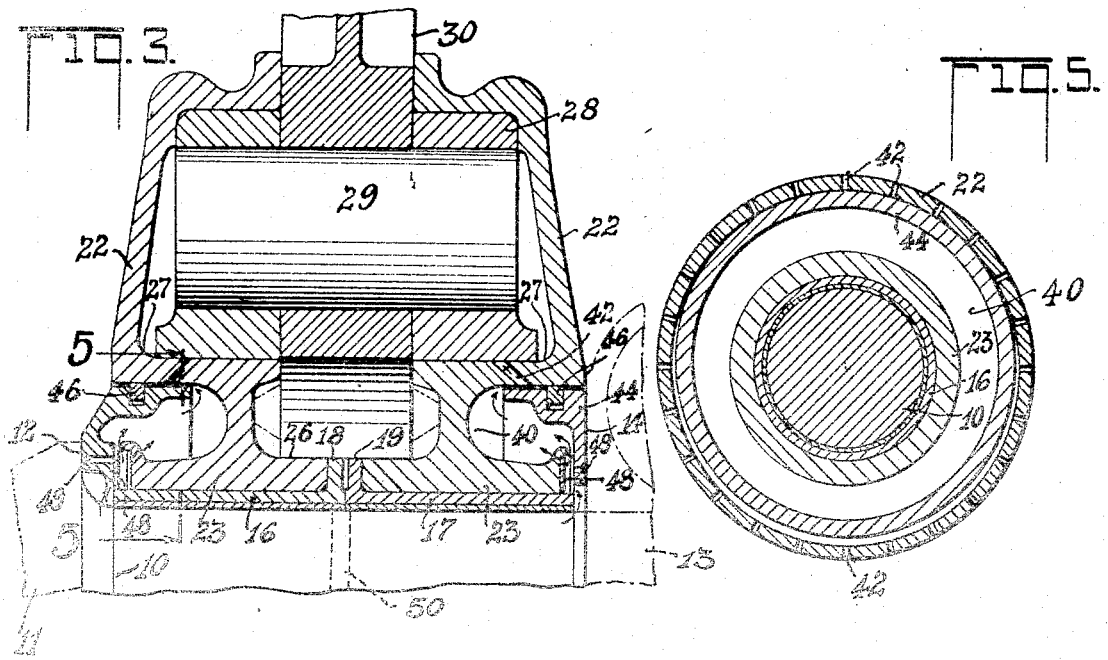
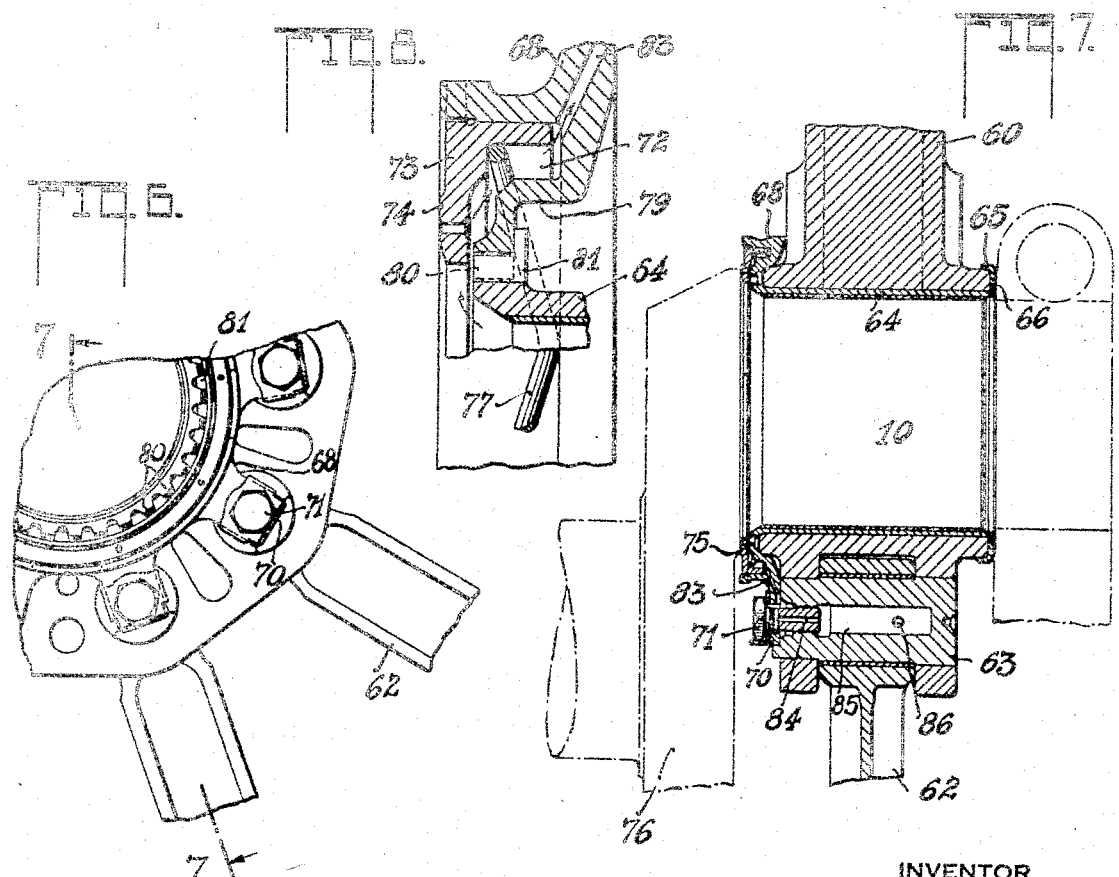
INVENTOR
HENRY C. HILL
BY
ATTORNEY Patented Apr. 22, 1941

2,239,039

UNITED STATES PATENT OFFICE 2,239,039

CONNECTING ROD

Henry C. Hill, Paterson, N. J., assignor to Wright Aeronautical Corporation, a corporation of New York Application April 9, 1938, Serial No. 201,093

24 Claims. (Cl. 74—580)

This invention relates to connecting rods for radial cylinder engines, comprising, in one aspect, improvements in true motion connecting rods (as a further development of my Patent No. 1,988,189, issued January 15, 1935), and, in another aspect, comprising improvements in means for sealing and lubricating the bearings of radial cylinder engine connecting rods.

In one of its aspects, the invention has for an object the provision of a connecting rod system in which each of a plurality of individual connecting rods is maintained in true radial relation to a crankpin, the several rods being susceptible to relative angulation as the crankpin moves in its orbit around the crankshaft center.

A further object is to provide means by which the individual rods have a substantial amount of circumferential embracement of the crankpin to stabilize respective rods against tilting, an associated object being the provision of stabilizing extensions on the respective rods each of which lies between one of the adjacent rods and the crankpin.

Still another object is to provide a mode of bearing assembly in a connecting rod system whereby the bearing is locked from rotation with respect to its adjacent supporting structure.

Another object is to provide means for lubricating a rod system comprising a plurality of individually movable connecting rods mounted in an annular bearing member which in itself is rotatable upon a crankpin, the lubricating provisions including means to prevent excessive bleed of oil fed from a crankpin bearing.

Still another object of the invention is to provide end seals in a connecting rod bearing to prevent undue loss by oil bleed therefrom, and to utilize these end seals in connection with the lubrication of individual connecting rods articulated in the bearing member.

Further objects will be apparent in reading the annexed detailed description in connection with the drawings, in which:

Fig. 1 is an end view of a portion of a radial connecting rod system;

Fig. 2 is a perspective fragmentary view of one of the connecting rods;

Fig. 3 is an axial section through part of the connecting rod system comprising a section on the line 3—3 of Fig. 1;

Fig. 4 is an exploded view of the bearing assembly and fragments of the connecting rod system;

Fig. 5 is a section on the line 5—5 of Fig. 3;

Fig. 6 is an end view of a rod system showing an alternative means for bearing locking and lubricating;

Fig. 7 is an axial section on the line 7—7 of Fig. 6; and

Fig. 8 is an enlarged fragmentary section of a portion of Fig. 7.

Referring first to Figs. 1 to 5, inclusive, the crankpin of a crankshaft is indicated at 10, this having a left hand crankcheek 11 provided with a sealing face 12 and a clamped cheek 13 provided with a sealing face 14. On the crankpin, in bearing engagement therewith, are bearing halves 16 and 17 having, respectively, central abutting flanges 18 and 19 best shown in Fig. 4. These flanges have segmental interruptions 20 and the bearings 16 and 17 are embraced by opposed similar track members 22, each of which includes a bearing housing 23 provided with projections 24 which, when assembled upon the bearings 16 and 17, engage within the segmental cutouts 20 of the bearing flanges 19. By referring to Fig. 4, it will be noted that the opposed housings 23 are disposed so that the projections 24 are angularly displaced from one another, the projections 24 of one housing engaging one set of cutouts 20 in the bearings 16 and 17, and the projections 24 of the other housing engaging another set of cutouts 20 in the bearing members 16 and 17. When so assembled, the housings 23 and the bearings 16 and 17 are all locked together from relative rotation.

The members 22, when assembled, comprise an inner circumferential track 26 and opposed, facing grooves 27 forming raceways. Within the latter are disposed segmental bearing blocks 28 bearing on the inner and outer groove faces, the blocks 28 being provided with bores to receive a crosspin 29 upon which is mounted a connecting rod 30. The pin 29 may either be integral with the rod 30 or may be loosely fitted thereto, and it will be seen that operating pressures upon each rod 30 are transmitted through the pin 29 and the blocks 28 to the groove faces of the bearing members 22. The inner end of each connecting rod 30 is provided with an arcuate track 32 concentric with the crankpin and each rod is also provided with an extension 34 carrying rollers 35 mounted on a pin 36, which rollers engage the inner track 26 and also engage the inner track 32 of the next adjacent connecting rod. When the rod system is assembled, as indicated in Fig. 1, it will be apparent that each rod is held against circumferential tipping by the engagement of the rollers 35 with the tracks 26 and 32, while main operating loads are carried upon the blocks 28.

Each rod is recessed as at 38, on that side opposite to its extension 34, to accommodate the extension of the next adjacent rod. Fig. 1 shows three connecting rods A, B and C, the rods A and B being shown in position for minimum included angle, while the rods B and C are positioned to show the maximum included angle, these angles respectively being based upon the use of nine connecting rods, appropriate to a nine-cylinder engine, wherein the maximum included angle, in a true motion rod system, varies from 30° to 50° approximately according to crank position. In a nine-cylinder engine, the angle between adjacent cylinders is 40°. The inner track 32 on each connecting rod will be of sufficient circumferential embracement to assure contact of the rollers 35 with the track during a complete revolution of the crankpin.

By this general arrangement, several distinct advantages accrue. The stabilizing leverage afforded for each rod by the extension 34 is considerable, while holding the diameters of the bearing members 22 to small compass and permitting of the inclusion of a large number of connecting rods. The bearing blocks 28 articulate slightly upon the pins 29 to take care of Michell effect in their lubrication independent of the tilting forces imposed upon the rod by operating stresses. This effect is necessary to their proper lubrication; and it will be noted that the block bearing surfaces are offset from the center of the pin 29 (Fig. 1) as at 39 to provide lower bearing pressure at the toes of the block than at the heels thereof. The blocks are preferably made of bearing material such as bronze and thus the use of annular liners of bearing material in the grooves 27 is made unnecessary. Since the bearing members 22 are journaled on the crankpin 10, the members will have no wholly determined rotational attitude with respect either to the crankpin or the rods. The bearing members 22 will tend to describe an orbital path, about the crankpin, but still they are expected to creep rotationally with respect to the connecting rods as the latter angulate relative to one another, to distribute wear evenly about the grooves 27 and to provide for more efficient lubrication of the blocks 28 and grooves 27.

In the connecting rod patent referred to at the beginning of this description, each connecting rod had a stabilizing extension integral with the rod, and the main bearing slippers of each rod were also integral with the rod. This invention comprises a substantial improvement over the teaching of said patent, due to the elimination of one of the sets of grooves in the bearing member and to the use of part of an adjacent rod as a portion of the guiding track for the rod extension. Machining processes in the present arrangement are vastly simpler than those which would be necessary in the fabrication of slipper rods and bearings of the prior art.

To provide for adequate lubrication of the rod system, each bearing member 22 is provided with an annular end cavity 40, the outer wall of which is drilled as at 42 at a plurality of circumferentially spaced points to permit of oil feed from the cavity 40 to the block groove 27 for lubrication of the blocks. Within the cavity 40 is disposed a sealing ring 44 of smaller diameter than the outer wall of the cavity 40, this ring being provided with a split ring 46 seated in a groove therein and bearing upon the wall of the cavity 40. A waved spring 48 between the end of the housing portion 23 and an inward projection of the ring 44 urges the latter outwardly into end sealing engagement with the crankcheek faces 12 and 14, and oil, bleeding from the space between the crankpin 10 and the bearings 16 and 17 passes into the cavity 40, lubricating the end seals through holes 49 and passing through certain of the holes 42 for lubrication of the blocks 28. By the loose fit of the ring 44 in the member 22, it will tend to be thrown radially outward from the crankpin by centrifugal force, thus closing off the outermost holes 42 to prevent the passage of oil therethrough, but opening the innermost holes 42 for the passage of lubricant. Since centrifugal force will build a substantial pressure at the outermost portions of the cavity 40, this eccentric sealing arrangement prevents undue bleeding of oil from the cavity while permitting of oil flow to the bearing members 22 at the radially inward parts thereof where the centrifugal force is relatively low. It is to be understood that a crankpin 10, according to conventional practice, is hollow to provide an oil manifold, and that a drilling such as 50 in the crankpin provides for the flow of oil to the crankpin bearing. The ring 46 remains in contact with the wall of the cavity 40 to seal the ring 44, outboard of the holes 42, regardless of the eccentric position of the ring 44 relative to the bearing member.

In Figs. 6, 7 and 8 I show an oil seal organization comparable to that above described, but applied to a conventional connecting rod assembly utilizing a master rod 60, and auxiliary rods 62 articulated thereto on knuckle pins 63. In this case, the master rod 60 carries a crankpin bearing 64 bearing upon the crankpin 10. One end face of the master rod is provided with an end seal element 65 bearing against a co-acting sealing face on a crankcheek 66, this end seal preventing undue bleed of lubricant from that end of the bearing 64 during operation. The opposite end of the rod 60 is provided with an annular member 68 having radial extensions 70 engaging, through screws 71, the ends of the knuckle pins 63, the annular member 68 providing means for locking the knuckle pins in assembled relation in the rod 60. As shown in Fig. 8, the member 68 is provided with an end annular cavity 72 within which is seated an end seal annulus 73 adapted to slide axially relatively to the member 68 and to bear at its face 74 upon a co-acting face 75 on the crankcheek 76. A waved spring 77, interposed between the annuli 68 and 73, urges the latter annulus into sealing engagement with the crankcheek 76, preventing undue leakage of oil from the left end, as shown, of the crankpin bearing 64. Pressure exerted by the spring 77 reacts between the annulus 73 and the connecting rod 60, to assure end sealing contact between the seal 65 and the right hand crankcheek.

The annulus 68 has an inward annular extension 79 having teeth 80 engaging corresponding teeth 81 formed on the end of the bearing 64, whereby the bearing 64 is locked from rotation relative to the connecting rod 60 since the annulus 68 is firmly attached to the connecting rod.

The extensions 70 from the annulus 68 are provided with radial drillings 83 leading from the cavity 72 to the knuckle pins, so that that oil which accumulates in the cavity 72, as well as lubricating the end seal 74, passes to the knuckle pins for the lubrication thereof through drillings 84, 85 and 86 in the knuckle pin assembly.

It will be appreciated that the lubricating provisions for the rod embodiments of Figs. 1 to 5, on the one hand, and Figs. 6 to 8, on the other hand, have many features in common, and may generally be considered as a generic form of lubricating system for radial connecting rod arrangements of virtually any type.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What I claim is:

1. The combination with a crankpin bearing member having opposed facing grooves, of a plurality of rods each having slippers engaged in respective grooves, and an integral extension extending substantially tangentially of the bearing member from each rod having bearing means at its end in contact with the bearing member and an adjacent rod.

2. In a radial engine connecting rod system, an element having opposed, facing, annular grooves and a central track radially inward of the grooves, a plurality of similar connecting rods each having slippers engaged in said grooves and having an arcuate track formed on the inner end of each rod, and an extension on each rod extending substantially tangentially of the element having bearing means at its end engaging the central track of said element and the end track of the next adjacent connecting rod.

3. In a connecting rod system, an annular crankpin member having opposed, facing, annular grooves therein and a track thereon; and a plurality of connecting rods each having segmental bearing shoes articulated thereto and engaging said grooves, and means engaging the member track, carried by each rod, for stabilizing the rod in a radial attitude against tipping in the plane of rotation relative to said articulated bearing shoes.

4. In a connecting rod system including a crankpin, an annular member borne on said crankpin and having a pair of opposed, facing annular grooves therein, a segmental bearing block in each groove movable circumferentially relative to the member, a connecting rod articulated to said blocks, and means extending substantially tangentially of the bearing member from the rod and engaging the member for stabilizing the rod to a radial position relative to the crankpin.

5. In a connecting rod system, a bearing member having facing grooves, a plurality of connecting rods having articulated bearing blocks engaging said grooves for circumferential movement relative to the member, said rods and member together, between the inner end of the several rods and an outer face of the member, defining guide tracks, and an extension on each rod extending substantially tangentially of the bearing member and engaging said guide tracks.

6. In a connecting rod system, a crankpin having annular members thereon, said members being opposed, facing, grooves and being spaced apart at their outer edges to define a slot therebetween, a plurality of similar connecting rods each entering said slot and provided with a segmental bearing shoe slidably engaging the surfaces of said grooves, means articulating the shoes to the respective connecting rods, a track formed on said members radially inward of said grooves and of the inner ends of said rods, an extension on each rod extending obliquely therefrom, substantially tangentially relative to the annular members, and bearing means at the end of each extension engaging the track on said members and the inner end of the next adjacent rod.

7. In a connecting rod system, a crankpin, annular bearing shells in tandem relation on said pin, segmental projections on said shells, and bearing housing halves each substantially coextensive in length with one said shell and having projections interlocking with the projections of both bearing shells.

8. In a connecting rod system, a crankpin, annular bearing shells in tandem relation on said pin, segmental projections on said bearing shells, bearing housing halves each substantially coextensive in length with one said bearing shell and having projections interlocking with the projections of both bearing shells, said housings comprising members having opposed, facing, annular grooves, and a connecting rod extending radially from between said members and having bearing slippers engaging said grooves.

9. In a connecting rod system, a crankpin, annular bearing shells in tandem relation on said pin, segmental projections on said bearing shells, bearing housing halves each substantially coextensive in length with one said bearing shell and having projections interlocking with the projections of both bearing shells, said housings comprising members having opposed, facing, annular grooves, a connecting rod extending radially from between said members and having bearing slippers engaging said grooves, the slippers being articulated on respective rods, and means engaging a portion of said housings for stabilizing said rods in a radial position with respect to the crankpin.

10. In a connecting rod system, a crankpin, a pair of members journalled thereon in end to end relation, said members together comprising a track and having flanges formed with facing, annular, grooves radially outward of the track, means to lock said members to one another against relative rotational displacement, connecting rods having opposed slippers engaging said grooves, said rods terminating at their inner ends radially outward from said track and being provided thereat with a segmental inwardly facing track concentric with the members, and an extension on each rod in bearing engagement with the track on said members and with the inwardly facing track of the adjacent connecting rod.

11. In a connecting rod system, a crankpin, a pair of members journalled thereon in end to end relation, said members together comprising a track and having flanges formed with facing, annular, grooves radially outward of the track, means to lock said members to one another against relative rotational displacement, connecting rods having opposed slippers engaging said grooves, said rods terminating at their inner ends radially outward from said track and being provided thereat with a segmental inwardly facing track concentric with the members, and an extension on each rod in bearing engagement with the track on said members and with the inwardly facing track of the adjacent connecting rod, the slippers being journalled for articulation on said rods on an axis parallel to the crankpin axis.

12. A connecting rod for a radial engine comprising a cross-pin at an inner rod end, and segmental main bearing blocks journalled on said pin and disposed at opposite sides of the rod, the block bearing surface centers being respectively offset from the rod and cross-pin axes in the direction of rod movement.

13. A connecting rod for a radial engine comprising a cross-pin at the inner rod end, segmental main bearing blocks journalled on said pin and disposed at opposite sides of the rod, an angled extension at the pin end of the rod, and rollers carried by said extension.

14. In a radial connecting rod system, a crankpin, a convex journal track thereon, annular bearing members defining inwardly facing concave cylindrical bearing tracks, on the crankpin, and defining therebetween an open slot, a plurality of similar connecting rods disposed around said pin, each comprising convex slippers on opposite sides of the rod engaging said inwardly facing bearing tracks and each comprising a concave bearing track facing the convex crankpin track, and an extension on each rod extending substantially tangentially of the crankpin and having bearing elements engaged between the convex crankpin track and the concave bearing track of the next connecting rod.

15. In a radial connecting rod system, a plurality of similar connecting rods disposed around a crankpin, each rod having a bearing element engaging a track embracing the crankpin and each rod having an inwardly facing track engaged by the outer part of the bearing element of the next adjacent rod, slipper elements on the sides of each rod circumferentially spaced around the crankpin from respective bearing elements, and cup-like bearing races concentric with the crankpin embracing the slippers and in bearing engagement with the slippers of the several rods.

16. In a radial connecting rod system, a plurality of similar connecting rods disposed around a crankpin, each rod having a bearing element engaging a track embracing the crankpin and each rod having an inwardly facing track engaged by the outer part of the bearing element of the next adjacent rod, slipper elements on the sides of each rod circumferentially spaced around the crankpin from respective bearing elements, and cup-like bearing races concentric with the crankpin embracing the slippers and in bearing engagement with the slippers of the several rods, said bearing elements being articulated on respective rods.

17. In a radial connecting rod system journalled on a crankpin, axially spaced cups having inwardly facing tracks, a plurality of identical connecting rods each one comprising bearing parts at its inner end spaced apart circumferentially of the crankpin, one said part having bearing engagement with the crankpin and with a portion of the adjacent rod, and the other said part having bearing engagement with said cup tracks.

18. In a radial connecting rod system, a crankpin having a journal thereon and having axially spaced, opposed annular cups defining inwardly facing tracks, a plurality of similar connecting rods having shanks disposed between the cup peripheries and each having a concave inwardly facing track, each said rod having a first bearing portion engaged between the crankpin journal and the inwardly facing track of the next rod, and having a second bearing portion circumferentially spaced around the pin from the first portion, said second portion having bearing engagement with the inwardly facing tracks of said annular cups.

19. The combination with a crankpin bearing member having outwardly and inwardly facing concentric tracks, of a plurality of rods each having bearing surfaces engaged with the tracks and each having an inwardly facing bearing surface, and a bearing element on each rod engaged with the inwardly facing bearing surface of the adjacent rod.

20. In a connecting rod system, a crankpin member comprising inwardly and outwardly facing tracks, and a plurality of connecting rods each having segmental bearing shoes articulately pivoted thereto for bearing engagement with the tracks.

21. In a connecting rod system, a crankpin member comprising axially spaced annular tracks, and a plurality of connecting rods each having a bearing shoe articulately secured thereto on each side of the plane of rod symmetry for engagement one with each crankpin track.

22. In a connecting rod system, a crankpin member comprising axially spaced annular tracks, a plurality of connecting rods each having a bearing shoe articulately secured thereto on each side of the plane of rod symmetry for engagement one with each crankpin track, and means engaging said rods to hold them against outward displacement and to hold the shoes in track engagement.

23. A connecting rod for a radial engine comprising journals projecting from opposite sides of the rod at the inner rod end, and segmental bearing blocks borne on said journals.

24. A connecting rod for a radial engine comprising journals projecting from opposite sides of the rod at the inner rod end, segmental bearing blocks borne on said journals, and means to stabilize the rod against tipping on the axis of the journals.

HENRY C. HILL.